United States Patent [19]

Beaty

[11] Patent Number: 5,037,167
[45] Date of Patent: Aug. 6, 1991

[54] ELECTRICAL AND FIBER OPTIC CABLE CONTROL AND MANAGEMENT

[75] Inventor: Robert C. Beaty, Raleigh, N.C.

[73] Assignee: Alcatel NA, Inc., Hickory, N.C.

[21] Appl. No.: 345,779

[22] Filed: May 1, 1989

[51] Int. Cl.$^5$ .............................. G02B 6/36
[52] U.S. Cl. ..................... 385/147; 379/326; 379/329; 379/397; 385/53
[58] Field of Search .............. 350/96.1, 96.2, 96.23; 379/325, 326, 327, 328, 329, 330, 397

[56] References Cited

U.S. PATENT DOCUMENTS

| 4,605,275 | 8/1986 | Pavel | 379/329 X |
| 4,792,203 | 12/1988 | Nelson et al. | 350/96.1 X |
| 4,881,792 | 11/1989 | Alameel et al. | 350/96.20 |
| 4,890,894 | 1/1990 | Kwa | 350/96.20 |

FOREIGN PATENT DOCUMENTS

| 1107725 | 5/1961 | Fed. Rep. of Germany | 379/329 |
| 3629551 | 3/1988 | Fed. Rep. of Germany | 379/397 |

Primary Examiner—John D. Lee
Attorney, Agent, or Firm—Peter C. Van Der Sluys

[57] ABSTRACT

In order to protect electrical and fiber optic cables in a central telephone office terminal equipment frame, the cables are controlled and managed so as to be releasably retained in a service loop within a fiber management panel. The releasable retention is performed by a stretched extension spring selected, dimensioned and stretched in such a manner with respect to the diameter of the cables that each cable can be gently but firmly retained when pressed into the gap between adjacent coils. The retention spring permits emergency release of the cable in the event of mishandling of the equipment by service personnel.

24 Claims, 1 Drawing Sheet

ELECTRICAL AND FIBER OPTIC CABLE CONTROL AND MANAGEMENT

BACKGROUND OF THE INVENTION

The invention relates generally to a device for holding electrical and fiber optic cables, and, more particularly, to a device for holding electrical and fiber optic cables flexibly and releasably connected in combination with moveable modules so as not to change or degrade the cables during movement of the modules.

New central telephone office terminal equipment designed and sold by Alcatel Network Systems of Raleigh, N.C. provides the introduction of sub-shelf size moveable modules and assemblies, i.e., electrically functional modules and assemblies that, while in service and carrying traffic, can be pulled out of their parent shelf or housing like a book off a bookshelf. This feature imposes the requirement that all electrical and optical connections from the module to "the rest of the world" must be flexibly implemented such that, during the movement in and out of the shelf, no damage or degradation occurs to the electrical or optical cables attached thereto. Additionally, even with the module in place in its shelf, there may be reason to remove a given printed board assembly from the module, again without damage or degradation to any electrical or optical cable attached to that module. Electrical cables are rather tolerant to being so manipulated, but optical cables have the general requirement that they not be "bent" into a radius of less than one inch (1").

Other methods for handling electrical and fiber optic cables to date have been for static situations not involving the relative motion of components such that interconnecting fiber cables only had to be managed to prevent damage. Previously, mechanical protection, such as fixing and routing, was sufficient protection for the cables.

The above features and requirements for protecting the cables present a rather formidable design problem. The present invention is designed to overcome the above noted limitations, and toward this end, it contemplates the provision of a novel, sufficiently forgiving and compliant means of control and management over the electrical and optical cables so that the cables will not be damaged even if an operator neglects instructions and fails to follow proper procedures in handling the equipment in removing assemblies, modules, etc.

It is an object of the present invention to provide a novel retention member in the form of an extension spring for releasably retaining the cables.

It is also an object to provide such a device which can release the retained cable in an expedited manner.

Still another object is to provide such a device in which the retained cables can be easily removed in a single operation without the need for tools and the like.

An additional object is to provide such a device which will maintain the fiber optic cables within specification and help prevent them from being bent into a radius of less than one inch (1").

A further object is to provide such a device which may be readily and economically fabricated and will enjoy a long life in operation.

A further object is to provide such a device which will retain said cables in a multiplicity of horizontal locations, such that any combination of modules can be accommodated, no matter how many cables are associated with a given module or their relative location in the module.

A further object is to provide such a device which will readily accommodate addition or removal of modules by the customer, at his site, while other adjacent installed modules remain in service carrying traffic as normal.

SUMMARY OF THE INVENTION

It has now been found that the foregoing and related objects can be readily obtained in a device in which electrical and/or fiber optic cables can be organized and controlled in a systematic but compliant manner. Since the designer of central office terminal equipment often times does not know the complement of modules that will populate a given sub-frame, any combination of modules and their cables must be accommodated by the device of the present invention. This invention accomplishes this requirement by providing a multiplicity of positions for cable retention via a stretched extension spring located across the front of its slideable fiber management panel, each pitch of the spring providing a possible "slot" for retaining a cable. This stretched extension spring with its inherent characteristics and geometry coupled with the method of mounting it into the panel create a very forgiving and compliant means for retaining and controlling cables which does not over-constrain the cables and expose them to risk of damage.

The invention will be fully understood when reference is made to the following detailed description taken in conjunction with the accompanying drawing.

DETAILED DESCRIPTION OF THE PREFERRED EMBODIMENT

Figure 1:
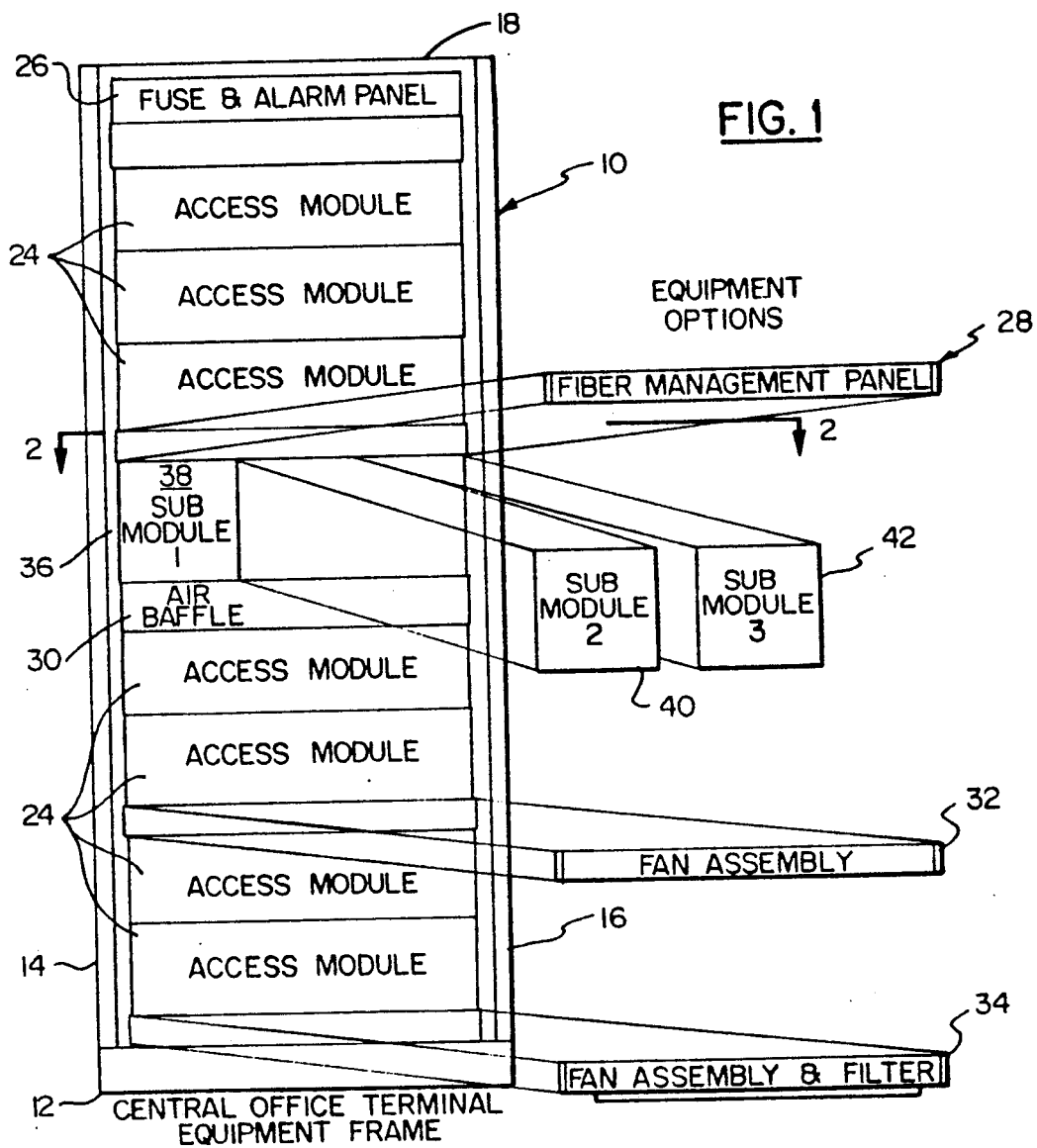
FIG. 1 is a stylized front elevational view of the central office terminal equipment frame of the present invention with various assemblies and submodules shown being removed therefrom or inserted therein.
Figure 2:
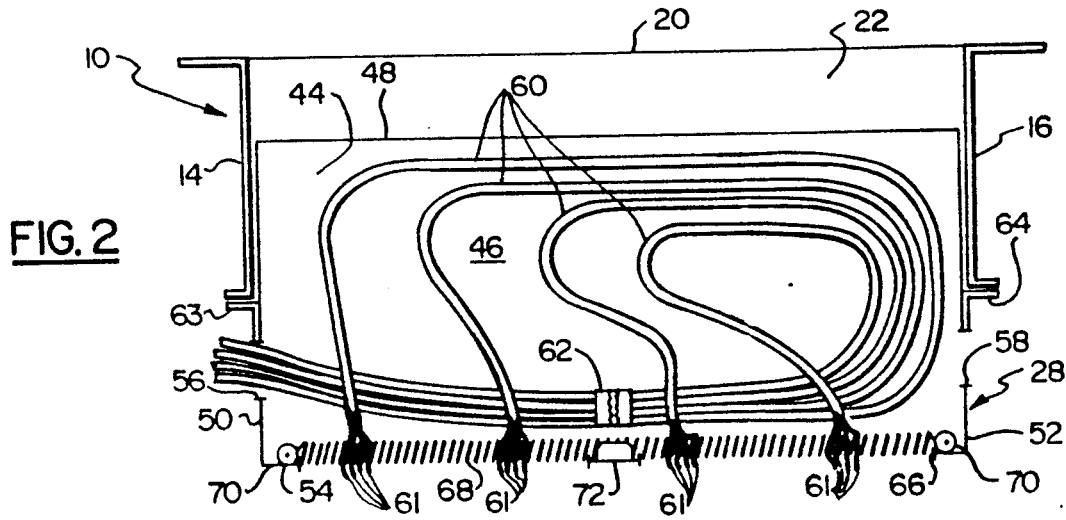
FIG. 2 is a cross-sectional view taken along the 2—2 line of FIG. 1 showing fiber management panel of the present invention inserted in the support enclosure.

Turning first to FIG. 1 of the drawing, therein illustrated is a support enclosure generally indicated by the numeral 10 which, in this case, is in the form of a central telephone office terminal equipment frame. The support enclosure 10 has a generally rectangular base panel 12, and extending upwardly from the bottom panel 12 is a pair of U-shaped side panels 14, 16 with a top panel 18 thereon. As best seen in FIG. 2, a rear panel 20 completes the support enclosure 10 thereby defining a generally rectangular cavity 22.

Slideably received in the generally rectangular cavity 22 of the support enclosure 10 is a plurality of slideable subframe components which can be various modules 24, for example, electronic components for transmission of telephone signals, and associated assemblies such as fuse and alarm panel 26, fiber management panel 28, air baffle 30, fan assembly 32 and fan and filter assembly 34. Centrally located in the support enclosure 10 is a subframe mounting assembly 36 having three functional submodules 38, 40 and 42 mounted therein.

The fiber management panel 28 will now be described in detail with particular reference to FIG. 2. The fiber management panel 28 includes a slideable drawer or tray 44 that can be moved into and out of the support enclosure 10. The drawer has a generally rectangular bottom wall 46, a rear wall 48, two upstanding side walls 50, 52 and a front wall 54. The side walls 50, 52 have access openings 56, 58 to permit the entrance of fiber cable bundles 60 therethrough with each fiber bundle 60 typically having two, four or eight individual fiber cables 61. The group of bundles 60 can include a fiber bundle connector 62. The side walls 50, 52 also have flanges 63, 64 extending outwardly therefrom which allow the drawer 44 to be releasably secured to the U-shaped side panels 14, 16 by bolts or other appropriate means (not shown). The front wall 54 of the drawer 44 is provided with an aperture 66 largely open to allow easy and spacious access for routing cables 60 from inside the drawer 44 to the appropriate functional submodules 38, 40 and 42 located directly therebelow (see FIG. 1). Stretched across the lower part of the aperture 66 is an extension spring 68, such as a standard 0.431 inch outside diameter, closed coil spring wound with 0.035-0.040 inch wire. To make the extension spring 68, the spring is wound, cut to approximately six inches (6") in length, and one coil on either end is bent down for anchoring on anchor studs 70. The spring 68 is then stretched to approximately twenty inches (20") in length and secured between the anchor studs 70. A brace tongue 72 supports the center of the extension spring 68. The resulting spacing between the above described spring's coils will be correct for retaining standard fiber cables. Other coil spacings and geometrics can be easily attained by altering the coil diameter, cut free length, and stretched length; all within the scope of this invention. For example, one could accomplish the same end result by winding a very specific compression spring instead of using an extension spring.

The mix of functional submodules served by the fiber management panel 28 can comprise submodules 38, 40 and 42 in virtually any combination. Submodules 40 and 42 may use four (4) fiber cables 61, while submodule 38 may use eight (8) fiber cables. There can be up to three (3) submodules 38 and four (4) submodules 40 or 42 served by a given fiber management panel 28. Thus, a maximum of twenty-four (24) fiber cables 61 must be accommodated by the fiber management panel 28 in this described embodiment. However, this is not limiting.

The fiber cable bundles 60, grouped in fours, are brought into the fiber management panel 28 from either the left or right side walls 50, 52 through access openings 56, 58. Assuming entry from the left through access opening 56 as shown in FIG. 2, the fiber cable bundles 60 are routed from left to right along the front of the drawer 44 to the right hand side and looped back in a counterclockwise fashion, forming a large service loop. The cable bundles 60 are then brought forward to the front of the drawer 44 where each individual fiber cable 61 is pressed into a coil gap in the stretched extension spring 68, which gently retains the fiber cable 61 in place. Up to the required six (6) cable bundles 60 can be easily accommodated. The opposite hand installation (from the right) is just as easily accomplished.

The stretched extension spring 68 is selected, dimensioned and stretched in such a manner with respect to the diameter of the fiber cables that each cable is gently but firmly retained when pressed into the gap between adjacent coils. It is a requirement that the fiber cable not be bent in a radius smaller than one inch (1"). The stretched extension spring 68 uniquely meets this requirement by flexing in all three orthogonal directions plus rotation. Additionally, a sharp tug on any given cable 61 of the cable bundle 61, as might be encountered if an operator inadvertently tried to remove one of the submodules 38, 40 or 42 without properly releasing the cables 61, will cause its release from the spring 68 without exceeding the minimum radius limit. This offers great advantage over other fiber cable retention means which are not properly compliant.

Additionally, a single fiber cable is routed to a given printed board assembly (PBA) within a submodule, and this individual PBA can be removed from the submodule without damaging its cable or disturbing neighboring cables.

While the preferred embodiment has been shown using fiber optic cables, those skilled in the art will appreciate that the present invention can also be used in connection with electrical cables.

Thus, it can be seen from the foregoing specification and attached drawing that the electrical and fiber optic cable holding device of the present invention provides an effective means for flexibly and releasably connecting the cables to moveable modules in order to prevent damage or degradation of the cables during movement of the modules.

The preferred embodiment described above admirably achieves the objects of the invention; however, it will be appreciated that departures can be made by those skilled in the art without departing from the spirit and scope of the invention which is limited only by the following claims.

Having thus described the invention, what is claimed is:

1. An equipment frame having electrical and fiber optic cable control and management capabilities, comprising:
    a support enclosure defining a cavity therein;
    a removable module mounted in said cavity;
    a plurality of operating transmission cables servicing said removable module; and
    means releasably retaining said cables in position during normal operation of said module but permitting release if removal of the removable module is attempted without first removing said cables therefrom.

2. The equipment frame in accordance with claim 1, wherein said releasable retaining means is provided by resilient means.

3. An equipment frame having electrical and fiber optic cable control and management capabilities, comprising:
    a support enclosure defining a cavity therein;
    a removable module mounted in said cavity;
    a plurality of operating transmission cables servicing said removable module; and
    a spring for releasably retaining said cables in position during normal operation of said module, but permitting release if removal of the module is attempted without first removing said cables therefrom.

4. The equipment frame in accordance with claim 3, wherein said spring is an extension coil spring.

5. The equipment frame in accordance with claim 4, wherein said extension coil spring is stretched so as to form gaps between the coils of said spring, each of said gaps being dimensionally sized to accept and firmly retain one of the cables.

6. The equipment frame in accordance with claim 3, further including a drawer mounted slideably within said cavity of said support enclosure.

7. The equipment frame in accordance with claim 6, wherein said slideable drawer has said spring mounted therein.

8. The equipment frame in accordance with claim 7, wherein said spring is an extension coil spring.

9. The equipment frame in accordance with claim 8, wherein said extension coil spring is stretched so as to form gaps between the coils of said spring, each of said gaps being dimensionally sized to accept and firmly retain one of the cables.

10. The equipment frame in accordance with claim 7, wherein said cables run within said drawer and are releasably retained by said spring before passing on to said module.

11. The equipment frame in accordance with claim 10, wherein said cables form a service loop before passing through said spring.

12. The equipment frame in accordance with claim 11, wherein said spring is an extension coil spring.

13. The equipment frame in accordance with claim 12, wherein said extension coil spring is stretched so as to form gaps between the coils of said spring, each of said gaps being dimensionally sized to accept and firmly retain one of the cables.

14. A fiber optic cable control and management device permitting expedited removal of fiber optic cables therefrom, comprising:
 a base support;
 a plurality of fiber optic cables on said support; and
 means releasably retaining said cables in operative position on said base support solely by resilient pressure but permitting release of said cables without damage thereto.

15. The fiber optic cable control and management device in accordance with claim 14, wherein said releasable retaining means is provided by resilient means.

16. A fiber optic cable control and management device permitting expedited removal of fiber optic cable therefrom, comprising:
 a base support;
 a plurality of fiber optic cables on said support; and
 a spring releasably retaining said cables in operative position on said base support solely by resilient pressure, but permitting release of said cables without damage thereto.

17. The fiber optic cable control and management device in accordance claim 16, wherein said spring is an extension coil spring.

18. The fiber optic cable control and management device in accordance with claim 17, wherein said extension coil spring is stretched so as to form gaps between the coils of said spring, each of said gaps being dimensionally sized to accept and firmly retain one of the cables.

19. The fiber optic cable control and management device in accordance with claim 16, wherein said base support is a drawer which is slideably received in an equipment frame.

20. The fiber optic cable control and management device in accordance with claim 19, wherein said slideable drawer has said spring mounted therein.

21. The fiber optic cable control and management device 19, wherein said cables run within said drawer and are releasably retained by said spring before passing on to a module mounted in said frame.

22. The fiber optic cable control and management device in accordance with claim 21, wherein said cables form a service loop before passing through said spring.

23. An equipment frame having electrical and fiber optic cable control and management capabilities, comprising:
 a support enclosure defining a cavity therein;
 a removable module mounted in said cavity;
 a plurality of operating transmission cables servicing said removable module;
 a drawer mounted slidably within said cavity for storing excess cable length; and
 resilient means mounted in said slidable drawer for releasably retaining said cables in position during normal operation of said module, but permitting release if removal of the module is attempted without first removing said cables therefrom.

24. A fiber optic cable control and management device permitting expedited removal of fiber optic cables therefrom, comprising:
 an equipment frame;
 a drawer slidably received in said equipment frame;
 a plurality of fiber optic cables in said drawer; and
 resilient means in said drawer, for releasably retaining said cables in operative position in said drawer solely by resilient pressure, but permitting release of said cables without damage thereto.

* * * * *